United States Patent Office 3,458,307
Patented July 29, 1969

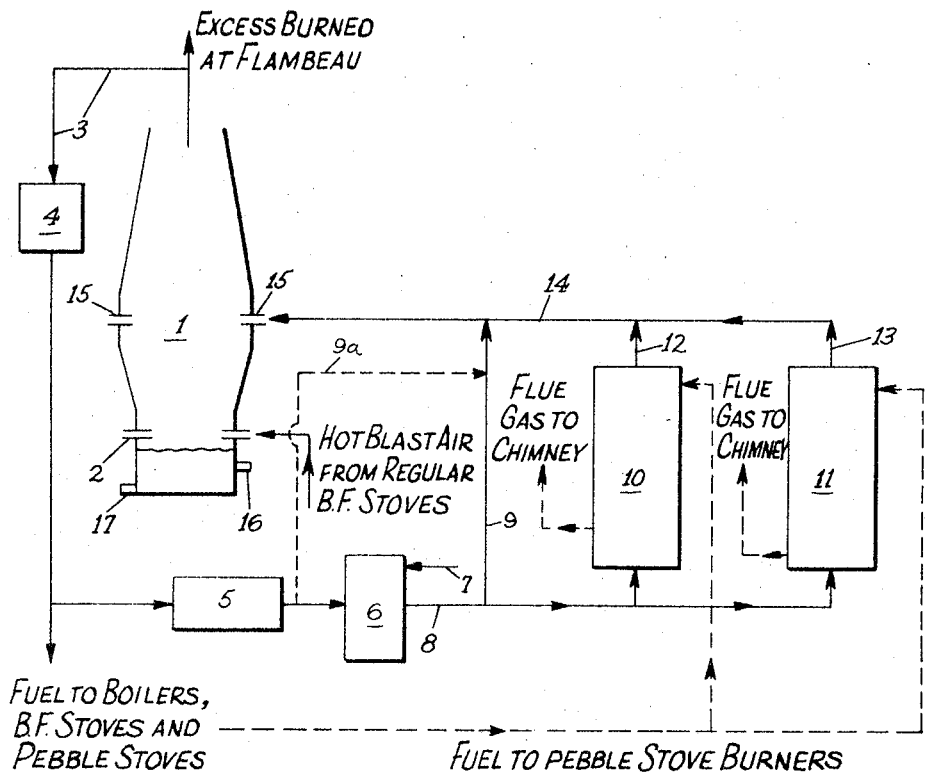

---

3,458,307
METHOD OF BLAST FURNACE REDUCTION OF IRON ORES
William E. Marshall and Arthur P. Kerschbaum, Middletown, Ohio, assignors to Armco Steel Corporation, Middletown, Ohio, a corporation of Ohio
Filed Mar. 7, 1967, Ser. No. 621,175
Int. Cl. C21b 7/16, 5/02
U.S. Cl. 75—42                                    7 Claims

ABSTRACT OF THE DISCLOSURE

Reduction of iron ores to produce molten iron by means of a gaseous mixture of carbon monoxide and hydrogen with consequent formation of carbon dioxide and water, the gases being regenerated by being withdrawn from the top of the blast furnace, enriched solely with a fluid, hydrocarbonaceous fuel, heated in pebble stoves at about 2000° to 3000° F. and returned to the reduction zone above the tuyeres at a temperature of about 1400° to 2000° F.

---

Background of the invention

This invention relates to a method of operating, and apparatus used in conjunction with, the iron blast furnace which results in a decrease in the amount of coke required per ton of iron produced and an increase in the production of iron per unit time. More specifically, the invention involves production of hot reducing gases by reacting a hydrocarbonaceous fluid fuel in pebble stoves with recirculated top gases from the blast furnace, and injecting these reformed gases into the blast furnace stack at the reduction zone above the conventional tuyeres at a point where the temperature of the stack is between 1400° F. and 2000° F., the temperature of the gases being preferably not less than that of the stock column at the point where the gases are injected.

As is well known, in the recovery of iron from iron ores in the blast furnace, iron ore, coke and limestone are introduced from the top, and molten iron and slag are tapped at the bottom at intervals. A blast of preheated air, or air enriched with oxygen, is introduced through tuyeres located in the lower part of the furnace. The oxygen of the air reacts with the coke to form carbon monoxide which in turn reduces the iron ore to form metallic iron and carbon dioxide. The iron is melted by the heat generated by the combustion of carbon at the tuyeres.

It is also conventional to supply a small amount of water vapor and/or carbonaceous material with the air introduced through tuyeres, and the water vapor forms hydrogen by reaction with the coke, the hydrogen so produced also reducing the ore.

Copending application Ser. No. 384,373, filed July 22, 1964, now Patent No. 3,375,098 in the name of William E. Marshall, discloses a process for the gaseous reduction of iron ore to iron in a shaft furnace containing no coke or limestone, in which the top gases from the shaft furnace containing carbon dioxide, water vapor and dust are cooled and cleaned. Some water is removed therefrom in the cleaning process, while allowing carbon dioxide to remain therein. The top gases are then enriched with a methane-bearing gas and are passed through a heating zone at about 2000° to 3000° F. to cause a reaction between carbon dioxide and methane, producing carbon monoxide and hydrogen, and the regenerated gases are then cooled to a temperature between about 1300° and about 1800° F. and are returned to the reduction zone of the shaft furnace.

In the process of this copending application regeneration of the top gases with methane or other hydrocarbonaceous fuel is effected without adding oxygen or an oxygen-containing medium. Using methane as an example, the reactions proceed in accordance with the following equations:

(1) 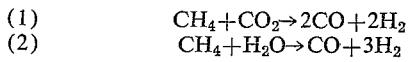$CH_4 + CO_2 \rightarrow 2CO + 2H_2$
(2) $\qquad CH_4 + H_2O \rightarrow CO + 3H_2$ It will be noted that these reactions double the volume of gas since four volumes are produced for each two volumes reacted, and these reactions provide carbon monoxide and hydrogen to reduce the iron ore in the shaft furnace. The extra volume of gas assures sufficient gas pressure in the event of leaks in the system.

United States Patent No. 2,727,816, issued Dec. 20, 1955, to J. Raick, discloses the injection of oxygen-reformed hydrocarbon material into a so-called "critical zone" of the blast furnace at a temperature above the stack temperature at the injection level, but does not suggest recirculation of the top gases. United States Patent No. 2,715,575, issued Aug. 16, 1955, to J. G. Coutant, discloses the injection of a blast gas containing at least 25% oxygen into the conventional tuyeres of a blast furnace and recirculated humidified top gases through additional tuyeres located below the conventional tuyeres. It is significant to note that both these prior art processes require an external source of oxygen, which is eliminated in the process and apparatus of the present invention.

In the practice of the present invention, the teachings of the above-mentioned copending application are applied to a blast furnace operation in which the iron-bearing charge may be lump iron ore, reduced or unreduced pellets or briquettes of iron ore, of any of these forms alone or in combination, or any of these combined with carbon-containing and/or fluxing materials such as coke and limestone. Whereas in the process of said Patent No. 3,375,098 the pelletized iron ore is reduced and then cooled and discharged from the bottom of a shaft furnace in the form of pellets, in the process and apparatus of the present invention, the iron oxide is completely reduced to iron and melted before it is discharged, and slag is formed and separately removed from the furnace. Moreover, unlike the above Patent, it has been found to be advantageous to leave an appreciable amount of water vapor in the cooled top gases along with carbon dioxide in order to form carbon monoxide and hydrogen in accordance with Equation 2.

Carbon monoxide and hydrogen react with iron ores in accordance with the following equations:

(3) 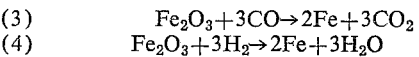$\qquad Fe_2O_3 + 3CO \rightarrow 2Fe + 3CO_2$
(4) $\qquad Fe_2O_3 + 3H_2 \rightarrow 2Fe + 3H_2O$ The amount of carbon monoxide and hydrogen produced by oxidation of coke at the tuyeres with air and moisture is insufficient to reduce the iron charge in the blast furnace, and the temperatures and operating conditions of the furnace are such that this deficiency is made up by a reaction between carbon dioxide and carbon in the lower portion of the shaft, above the tuyeres, where the temperature is quite high (between about 1400° and 2000° F.). Carbon dioxide is present in this region because unreduced iron oxide, in the form of FeO, has reached this lower portion of the furnace due to the insufficient amount of reducing gas formed at the tuyeres. The unreduced iron oxide provides the oxygen to react with carbon monoxide and form carbon dioxide according to the equation:

(5) $\qquad FeO + CO \rightarrow Fe + CO_2$

Since the temperature at this region of the furnace is high enough to cause reaction between carbon and carbon dioxide, the carbon dioxide formed by the reaction of Equation 5 reacts with the coke in the shaft as follows:

(6) $\qquad C + CO_2 \rightarrow 2CO$

Reaction 6 is endothermic and consumes approximately 6000 B.t.u. per pound of carbon. The consumption of carbon in the stack of a blast furnace by Equation 6 is commonly referred to as "solution loss," or endothermic gasification of carbon (EGC). In many instances this amounts to about 150 pounds of carbon per ton of iron produced, and an additional amount of 225 pounds of carbon per ton of iron would be required to be burned at the tuyeres in order to make up the heat loss, or a total of 375 pounds of carbon per ton of iron.

The consumption of this amount of carbon could be avoided if all the oxygen in the iron ore could be removed before it progressed down the shaft to a level at which the temperature is high enough to cause reaction 6 to proceed rapidly. Experimental work has proved this indirectly. For example, iron ore pellets have been pre-reduced outside the blast furnace and then smelted in the blast furnace with a complete elimination of the solution loss. Under such conditions the coke rate was approximately 600 pounds per ton of iron produced. This compares to a normal coke rate, with iron ore which has not been pre-reduced, of 1200 to 1300 pounds per ton of iron produced.

Summary of the invention

Application of the teachings of the present invention makes it possible to achieve a large part of the above-described saving in coke consumption without providing a second furnace for pre-reduction of the iron ore. Introduction of additional reducing gases prepared by the apparatus of the present invention into a properly designed blast furnace, at the proper location and temperature, will accomplish to a great extent the same result as pre-reduction outside the blast furnace. A coke rate of about 800 to 850 pounds per ton of iron produced can be achieved in the practice of this invention.

The principal object of the present invention is the provision of a process for reducing iron-bearing material in the conventional blast furnace, whereby to obtain molten iron, which utilizes the reducing potential of the top gases from the blast furnace by regeneration thereof with a fluid, hydrocarbonaceous fuel, without adding oxygen or an oxygen-containing medium.

It is another important object of the invention to provide a process which will substantially eliminate the solution loss encountered in conventional blast furnace operation.

Brief description of the drawing

These and other objects of the invention will be apparent to those skilled in the art from a consideration of the following detailed description taken in conjunction with the accompanying drawing which is a diagrammatic representation or flow sheet of the system of this invention.

Description of the preferred embodiment

Although not so limited, the process and apparatus of this invention will be particularly described in connection with a blast furnace operation in which coke and limestone are used in the conventional manner, and the iron ores are in the form of artifically produced pellets of beneficiated iron ores obtained from taconites.

It should be noted that none of the recirculated top gas is fed into the bottom of the blast furnace. Except for possible burning of some excess gas, one portion of the top gases is recirculated and regenerated with hydrocarbonaceous fluid fuel, while the remainder is used to heat the blast furnace stoves, pebble stoves and other apparatus requiring fuel.

Turning to a consideration of the drawing, a coventional blast furnace is indicated at 1 with tuyeres 2 through which a blast of preheated air from regular blast furnace stoves is introduced. As indicated previously, air enriched with oxygen, water vapor, and/or carbonaceous material may also be introduced through the tuyeres.

It will of course be understood that iron ores, carbonaceous and/or fluxing materials will be fed into the top of the blast furnace 1 by conventional means (not shown).

The top gas from the blast furnace is withdrawn through the conduit 3 and passed through a gas washer 4 which removes some of the moisture by cooling but does not substantially affect the carbon dioxide content. A portion of the cooled and cleaned top gas is then passed to pump 5 through suitable valving (not shown), while the remainder is piped elsewhere for fuel for various purposes. The portion of the top gas passed to pump 5 is introduced into gas holder 6 into which is also fed a fluid hydrocarbonaceous fuel, such as methane, natural gas, volatilizable petroleum fractions and the like, shown entering at 7. The gaseous mixture is then fed through conduit 8 to either of two pebble stoves 10 and 11 where reformation is carried out. While two stoves have been shown, more may be provided if desired.

The gases are reformed in pebble stoves using high alumina content pebbles which can be heated to at least 3000° F. However, the maximum operating temperature ordinarily does not exceed 2600° F. to 2700° F. in the dome portion of the stove during the heating and reforming cycles of the stove.

At least two pebble stoves are required so that when one stove is reforming gas, the other or others are being reheated. A burner is provided at the top of each stove which uses top gas from the blast furnace as fuel and combustion air from a fan to heat the pebbles until the temperature at the top of the stove reaches the desired range, i.e. between 2600° and 3000° F., and the desired quantity of heat is stored in the stove. At this point the burner is shut off and the gas mixture from line 8 is admitted to the bottom of the stove and flows upwardly in a direction opposite that of the combustion products during the preceding heating cycle of the stove.

It has been found helpful to treat the alumina-containing pebbles with a solution of nickel sulfate. This produces a more rapid reaction, and the stoves can be operated at a somewhat lower temperature, thereby prolonging the life of the stoves. The amount of nickel catalyst is not critical, and good results have been obtained by soaking the pebbles in aqueous solutions varying between 5% $NiSO_4 \cdot 6H_2O$ and saturated solutions of $$NiSO_4 \cdot 6H_2O$$

Other catalysts of known type may also be used and it is possible to operate without catalysts, using heat alone.

The reformed hot reducing gases, which have increased in volume in accordance with Equations 1 and 2, pass either through line 12 or line 13 into conduit 14 and are introduced into the blast furnace through ports 15 at a point above the tuyeres 2 where the temperature of the stock inside the furnace is between about 1400° and 2000° F.

A bypass 9 is provided between conduits 8 and 14, and the hot reformed gases in conduit 14 may thus be mixed with cooled top gases from conduit 8 in order to regulate the temperature of the gases at ports 15 to a temperature approximately the same as the temperature of the stock in this region i.e. between about 1400° and 2000° F. The gases introduced into conduit 14 through bypass 9 will also contain added methane or other fluid hydrocarbon which will crack, on contact with the hot reformed gases, to produce an additional amount of carbon monoxide and hydrogen. Alternatively a bypass 9a may be provided for mixing cooled top gases which do not contain added hydrocarbonaceous fuel with the hot reformed gases in conduit 14. The amount of cold gases so admitted into line 14 is regulated by automatic equipment (not shown) in order to produce a mixture of gases having a predetermined temperature. As each stove cools, the amount of gases introduced through bypass 9 or 9a will decrease, and at times no cold gas will be introduced into the conduit 14 from bypass 9.

Molten slag is withdrawn from the blast furnace periodically from the slag notch indicated at 16, while molten iron is withdrawn from the bottom of the furance from the iron notch indicated at 17.

A further advantage of the process and apparatus of the present invention arises from the lowering of the nitrogen content in the top gas from the blast furance. Conventional blast furnace top gas contains about 56% nitrogen. The introduction of reformed gases through the ports 15 lowers the nitrogen content of the top gas to about 35%, and the sum of the hydrogen and carbon monoxide content of the reformed gases is at least 60%, all percentages being by volume.

In the aforementioned, Patent No. 3,375,098 a portion of the cooled top gases is passed into the bottom of the shaft furnace in order to cool the reduced pellets. In contrast to this, in the process of the present invention, none of the recirculated top gases is fed into the bottom of the furnace. Instead, one portion is recirculated and regenerated with hydrocarbon fuel, while the remainder is burned to heat the blast furnace stoves, pebble stoves and other apparatus requiring fuel.

The decrease in the rate of coke or carbon consumed at the tuyeres achieved by the practice of the instant invention results in a corresponding increase in the tonnage of iron produced per unit time.

It will be understood that the invention is not limited to the preferred embodiment described above but is susceptible of modification within the scope of the appended claims.

The embodiments of the invention in which an exclusive property or privilege is claimed are defined as follows:

1. The the method of reducing iron ores to molten iron in a blast furnace, which comprises the steps of reducing said ores principally by a gaseous mixture consisting essentially of carbon monoxide and hydrogen at high temperature in the reduction zone of said furnace, with consequent formation of dust and top gases containing carbon dioxide and water vapor, withdrawing said dust and top gases from the furnace, cooling said top gases and removing said dust, reheating a portion of said top gases, and returning the gases to said furnace; the improvement which comprises enriching said portion of the cooled and cleaned top gases solely with a hydrocarbonaceous fluid fuel, heating the enriched gases to cause the fuel, and the carbon dioxide and water vapor in said top gases to react and produce carbon monoxide and hydrogen, and introducing said carbon monoxide and hydrogen into the reduction zone of the blast furnace stack at a temperature of about 1400° to 2000° F., whereby to supplement the reduction of iron oxides to molten iron.

2. The method claimed in claim 1, including the step of withdrawing a portion of said cooled top gases for use as a fuel in heating said enriched gases.

3. The method claimed in claim 1, including the step of mixing a portion of said cooled top gases with the heated reformed portion, whereby to control the temperature of the gases introduced to said reduction zone.

4. The method claimed in claim 3, wherein said portion of cooled top gases is enriched with hydrocarbonaceous fluid fuel prior to mixing with said heated portion.

5. The method claimed in claim 1, wherein the nitrogen cotnent of said top gases is not greater than about 35% by volume.

6. The method claimed in claim 1, wherein the sum of the carbon monoxide and hydrogen contents of the heated reformed gases returned to said reduction zone is at least 60% by volume.

7. A method of improving the operation of a conventional blast furnace for the production of molten iron from iron ores, comprising the steps of reducing iron ores principally with a gaseous mixture consisting essentially of carbon monoxide and hydrogen at high temperature in the reduction zone of said furnace, with consequent formation of carbon dioxide and water vapor in said gaseous mixture; regenerating the gaseous mixture by withdrawing the top gases from the blast furnace, cooling the top gases while allowing carbon dioxide and a substantial portion of water vapor to remain therein, enriching a portion of said cooled top gases solely with a hydrocarbonaceous fluid fuel; reheating said enriched portion in a stove maintained at a temperature of about 2000° to 3000° F. to produce carbon monoxide and hydrogen; and returning said portion to the reduction zone of said blast furnace at a temperature of about 1400° to 2000° F.

References Cited

UNITED STATES PATENTS

| | | | |
|---|---|---|---|
| 891,248 | 6/1908 | Gronwall | 75—42 X |
| 1,755,845 | 4/1930 | Snyder | 75—42 X |
| 2,142,100 | 1/1939 | Avery | 266—25 X |
| 2,598,735 | 6/1952 | Webb | 75—42 |
| 2,727,816 | 12/1955 | Raick | 75—42 |
| 2,837,419 | 6/1958 | Sellers et al. | 75—41 |
| 3,375,098 | 3/1968 | Marshall | 75—35 |

L. DEWAYNE RUTLEDGE, Primary Examiner

HENRY W. TARRING, III, Assistant Examiner

U.S. Cl. X.R.

266—17, 29